(No Model.)
W. A. HYDE.
RUNNER FOR VEHICLE WHEELS.
No. 364,591.  Patented June 7, 1887.
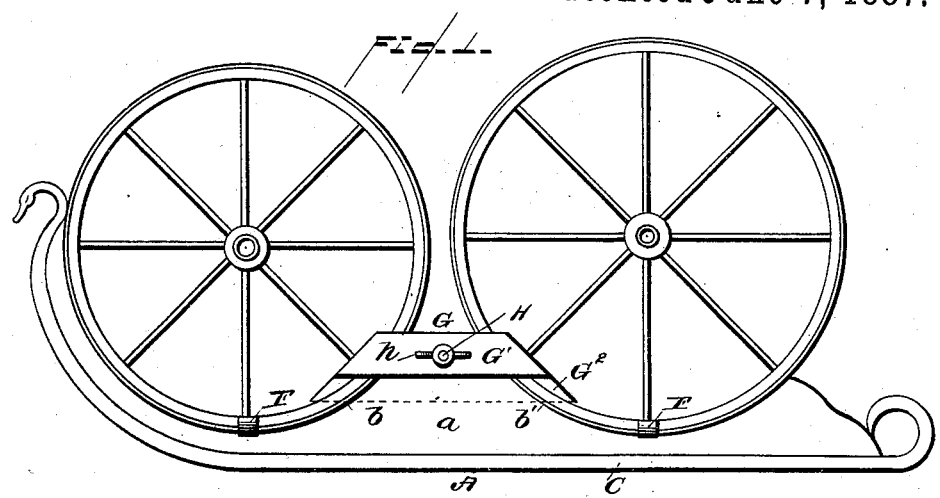
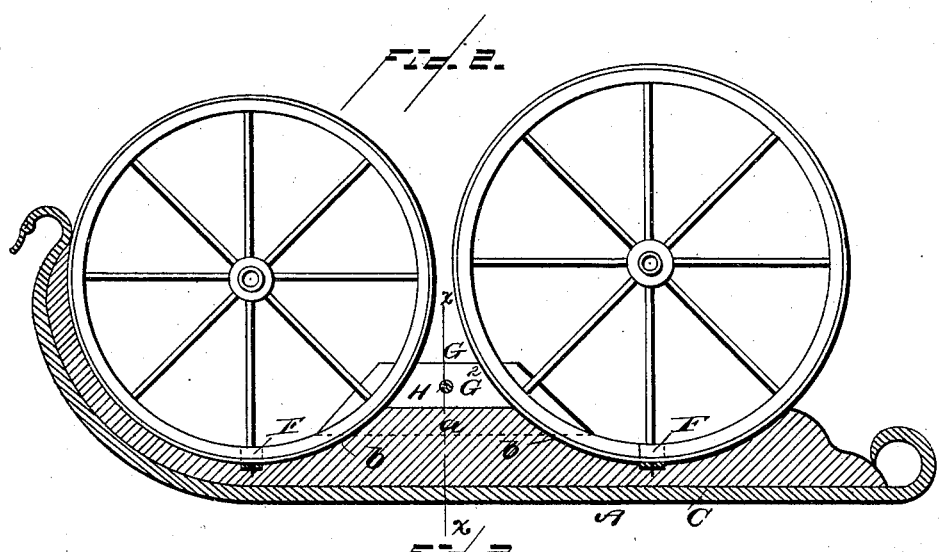
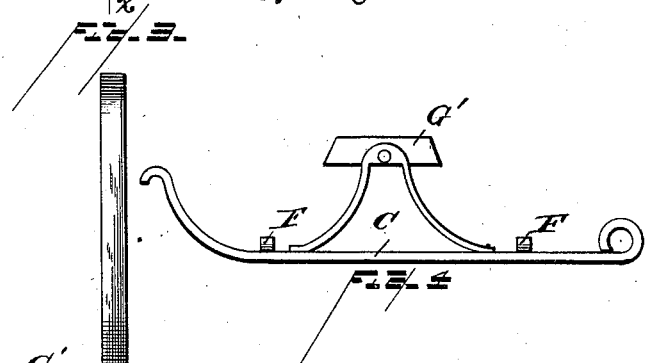
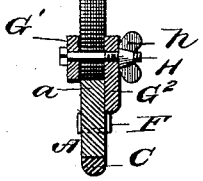
WITNESSES
INVENTOR
W. A. Hyde
By Edson Bros,
Attorney

UNITED STATES PATENT OFFICE.

WILLIAM A. HYDE, OF GRAND RAPIDS, MICHIGAN.

RUNNER FOR VEHICLE-WHEELS.

SPECIFICATION forming part of Letters Patent No. 364,591, dated June 7, 1887.

Application filed January 29, 1887. Serial No. 225,911. (No model.)

*To all whom it may concern:*

Be it known that I, WILLIAM A. HYDE, a citizen of the United States, residing at Grand Rapids, in the county of Kent and State of Michigan, have invented certain new and useful Improvements in Runners for Wheeled Vehicles, of which the following is a specification, reference being had therein to the accompanying drawings.

My invention relates to improvements in runners for wheeled vehicles; and it consists of the peculiar combination and novel construction of parts, substantially as hereinafter fully described, and particularly pointed out in the claims.

The primary object of my invention is to provide a runner which can be detachably and securely applied to the wheels of a vehicle—such as an infant's carriage, a buggy, wagon, or other light vehicle—so that it can be readily and easily drawn or moved over the ice, snow, &c.

A further object of my invention is to provide a runner of the class set forth which shall be connected and applied to the wheels in such a manner that the latter mutually brace one another and are prevented from getting out of line; and, finally, the object of my invention is to provide a runner which can be easily and readily applied to and be disconnected from the wheels in a minimum of time, and which shall be strong, durable, and cheap.

In the accompanying drawings, Figure 1 is a side elevation of a runner embodying my invention, showing it applied to the wheels of a vehicle. Fig. 2 is a longitudinal sectional view taken through the runner alone, with the wheels in elevation; and Fig. 3 is a vertical transverse sectional view on the line $x\ x$ of Fig. 2. Fig. 4 is an elevation of a modified form of runner embodying my invention.

Referring to the drawings, in which like letters of reference denote corresponding parts in all the figures, A designates the runner of my invention, which is provided at or near its middle with an integral vertical enlargement, $a$, and the upper surface of the runner and the sides of the enlargement thereof are curved or concaved, as at $b\ b'$, to closely approximate the convex surface or periphery of the wheels of the vehicle to be fitted therein.

The front end of the runner is extended forwardly and upwardly, so that it lies substantially in the same horizontal plane as the hub of the front wheel of the vehicle, and the rear end of the runner terminates on a plane beneath the upper edge of the central enlargement of the runner, as shown; but this form of the ends of the runner can be changed and modified at pleasure without departing from the spirit of my invention.

The lower side or surface of the runner is covered by a metallic shoe, C, which is rigidly and securely affixed thereto to prevent the runner from becoming worn by frictional contact with the surface over which it is moved. This shoe is made substantially convex in cross section on its lower side, as shown clearly in Fig. 3, and its ends are extended above and in front of the front end of the runner, while its rear end is turned or bent upwardly over the rear end of the runner, as shown.

At or near the middle of the concaved portions $b\ b'$ of the runner are affixed clips F, which are preferably substantially U shape in form, so that the fellies and tire of the wheels can fit therein to prevent the wheels from becoming displaced from the runner when the latter has been applied or connected to the wheels. These clips may be varied in form, and they are made of such a size as to closely fit the fellies.

G designates a clamp for connecting the runner and wheels more securely together. This clamp comprises two plates or sections, $G'\ G^2$, which are preferably flat metallic plates or strips having one or more transverse aligned openings, through which are passed one or more connecting-bolts, H, which serve to draw the plates or sections of the clamp together, and thereby cause them to bind upon the wheels and the runner, to prevent displacement of the parts. This clamp is arranged in a horizontal position, and it is of such a length as to permit its ends to bear firmly against the fellies of the wheels. The sections or plates are arranged parallel with each other, and one of the sections, preferably the section $G^2$, is of greater width than the section $G'$, so that when the clamp is adjusted the lower edge of the section $G^2$ is extended beneath the corresponding edge of the other section, to adapt it to bear or impinge against the upper portion of the central enlargement of the runner, as will be readily understood from the drawings.

The connecting-bolt is preferably provided at one end with an enlarged head, while a thumb-nut, $h$, is fitted upon its opposite threaded end, the head and nut bearing against the outer sides of the clamp-sections.

This being the construction of my improved runner, the operation thereof is as follows: The runner is first placed in proper position beneath the wheels of the vehicle, which are then lowered into the concaved portions $b\ b'$ of the runner, care being taken to adjust the wheels in the clips and so that they may bear or rest evenly against the concaved faces of the sides of the enlargement $a$. The clamp is now adjusted so that the sections thereof bear against the opposite sides of the two wheels, after which the bolt or bolts are passed through the clamp-sections and the nuts tightened to draw the sections together and cause them to bind on the wheels and the runner, the clips serving to prevent displacement of the wheels in thus adjusting the parts.

The device can be easily and readily applied to the wheels of the vehicle and as readily disconnected therefrom in a minimum of time, and the vehicle can be adapted to move freely over the ice without removing the wheels thereof.

My invention is simple, strong, and durable in construction, efficient and reliable in service, and cheap and inexpensive of manufacture.

Slight changes in the form and proportion of parts can be made without departing from the spirit of my invention.

In lieu of making the runner with the integral enlargement at its middle and having the concave sides, I may provide the runner with independent concave braces I, which are preferably made of metal and bent to the desired configuration, as shown in Fig. 4. These braces are secured in any preferable manner to the runner—as by bolts—and the bolt that connects the clamping-plates passes through the upper portions of the braces, as shown. The distance between the braces may be less than the space between the peripheries of two adjoining wheels, in order that the same runner may be used on vehicles of different sizes.

Having thus fully described my invention, what I claim as new, and desire to secure by Letters Patent, is—

1. A runner having the enlargement formed at or near its middle and the concaved portions $b\ b'$ in its upper side, and a clamp having the sections which bind against the wheels at their ends and are drawn together by an intermediate device, substantially as described.

2. The runner having the concaved portions for the reception of the wheels and a clamp having the sections arranged between the wheels, so that the ends will bear against the same, and a bolt or bolts for drawing the sections toward each other, and thereby causing them to bind upon the wheels, substantially as described.

3. The runner having the concaved portion, the clips affixed thereto within the said concaved portions, and a clamp comprising the sections, and an intermediate coupling-bolt, one of the sections being wider than the other, as and for the purpose set forth.

4. A runner having the concave portions adapted to receive the wheels of a vehicle, and a clamp having the coupled sections arranged transversely of the runner, and so constructed and proportioned as to embrace or lap the sides of the wheels to which the device is applied, as and for the purpose described.

In testimony whereof I affix my signature in presence of two witnesses.

WILLIAM A. HYDE.

Witnesses:
FRANK A. ROGERS,
G. S. PUTNAM.